United States Patent
Xiao et al.

(10) Patent No.: US 10,489,001 B2
(45) Date of Patent: Nov. 26, 2019

(54) TOUCH-SENSITIVE DEVICE AND PRODUCTION METHOD OF MAKING THE SAME

(71) Applicant: TPK Mastouch Solutions(Xiamen) Inc., Xiamen (CN)

(72) Inventors: Tiefei Xiao, Hengyang (CN); Yongshan Chen, Quanzhou (CN); Zhengmin Xie, Nanchang (CN); Hsien-Jung Li, Tainan (TW)

(73) Assignee: TPK MasTouch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 15/960,510

(22) Filed: Apr. 23, 2018

(65) Prior Publication Data

US 2018/0239470 A1  Aug. 23, 2018

Related U.S. Application Data

(62) Division of application No. 14/924,737, filed on Oct. 28, 2015, now Pat. No. 9,971,464.

(30) Foreign Application Priority Data

Oct. 29, 2014 (CN) .......................... 2014 1 0611911

(51) Int. Cl.
| | |
|---|---|
| *G06F 3/041* | (2006.01) |
| *G06F 3/044* | (2006.01) |
| *B05D 3/00* | (2006.01) |
| *H01L 23/52* | (2006.01) |

(52) U.S. Cl.
CPC ............. *G06F 3/044* (2013.01); *B05D 3/002* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 2011/0141037 A1* | 6/2011 | Hwang | G06F 3/044 345/173 |
| 2013/0043068 A1* | 2/2013 | Xie | G06F 3/044 174/262 |
| 2013/0127480 A1* | 5/2013 | Cuseo | G06F 3/044 324/686 |
| 2013/0241841 A1* | 9/2013 | Orsley | G06F 3/044 345/173 |
| 2015/0237757 A1* | 8/2015 | Lor | G06F 1/16 361/752 |

* cited by examiner

*Primary Examiner* — Shamim Ahmed
(74) *Attorney, Agent, or Firm* — Cooper Legal Group, LLC

(57) ABSTRACT

A touch-sensitive device includes a cover plate, at least one touch-sensing electrode, a masking layer, at least one trace and a plurality of electrically-conductive interconnects. The touch-sensing electrode is disposed on the cover plate and extends in a specific direction. The mask layer is disposed on a periphery of the cover plate and covers part of the touch-sensing electrode. The trace is disposed on the masking layer opposite to the touch-sensing electrode. The electrically-conductive interconnects penetrate the masking layer and are spaced apart from one another. Each of the electrically-conductive interconnects interconnects the touch-sensing electrode and the trace.

7 Claims, 3 Drawing Sheets

TOUCH-SENSITIVE DEVICE AND PRODUCTION METHOD OF MAKING THE SAME

The current application is a divisional application of U.S. application Ser. No. 14/924,737, now issued as U.S. Pat. No. 9,971,464, filed on Oct. 28, 2015, which claims a foreign priority to the Chinese Patent Application No. 201410611911.8, filed on Oct. 29, 2014.

BACKGROUND OF THE INVENTION

Technical Field

The disclosure relates to touch-sensitive devices, and more particularly to touch-sensitive devices with improved appearance, and production methods for making the touch-sensitive devices.

Related Art of the Invention

Touch displays are commonly used in modern electronic devices for display and input. Touch displays provide a more intuitive way to operate electronic devices. With technological development, besides display quality and touch input capabilities associated with the touch display, appearance is also a crucial factor that affects user experience.

SUMMARY OF THE INVENTION

An object of the present disclosure is to provide a touch-sensitive device with an improved appearance.

Another object of the present disclosure is to provide a production method of making the touch-sensitive device.

According to one aspect of the present disclosure, there is provided a touch-sensitive device, which includes a cover plate, at least one touch-sensing electrode, a masking layer, at least one trace and a plurality of electrically-conductive interconnects. The touch-sensing electrode is disposed on the cover plate and extends in a specific direction. The masking layer is disposed on a periphery of the cover plate and covers part of the touch-sensing electrode. The trace is disposed on the masking layer opposite to the touch-sensing electrode. The electrically-conductive interconnects penetrate the masking layer and are spaced apart from one another. Each of the electrically-conductive interconnects the touch-sensing electrodes and the trace.

According to another aspect of the present disclosure, there is provided a production method of making a touch-sensitive device, which includes the steps of: (A) forming at least one touch-sensing electrode on a cover plate and along a specific direction; (B) forming a masking layer that is disposed on a periphery of the cover plate, that covers part of the touch-sensing electrode and that is formed with a plurality of spaced apart through holes at regions covering the touch-sensing electrode; and (C) forming a plurality of electrically-conductive interconnects in the through holes, and forming at least one trace that is disposed on the masking layer opposite to the touch-sensing electrode and that is connected to the electrically-conductive interconnects.

The effect of the present disclosure is to improve the appearance of the touch-sensitive device with various designs of the electrically-conductive interconnects.

BRIEF DESCRIPTION OF THE DRAWINGS

Other features and advantages of the present disclosure will become apparent in the following detailed description of the embodiment with reference to the accompanying drawings, of which.

DETAILED DESCRIPTION OF THE EMBODIMENT

Figure 1:
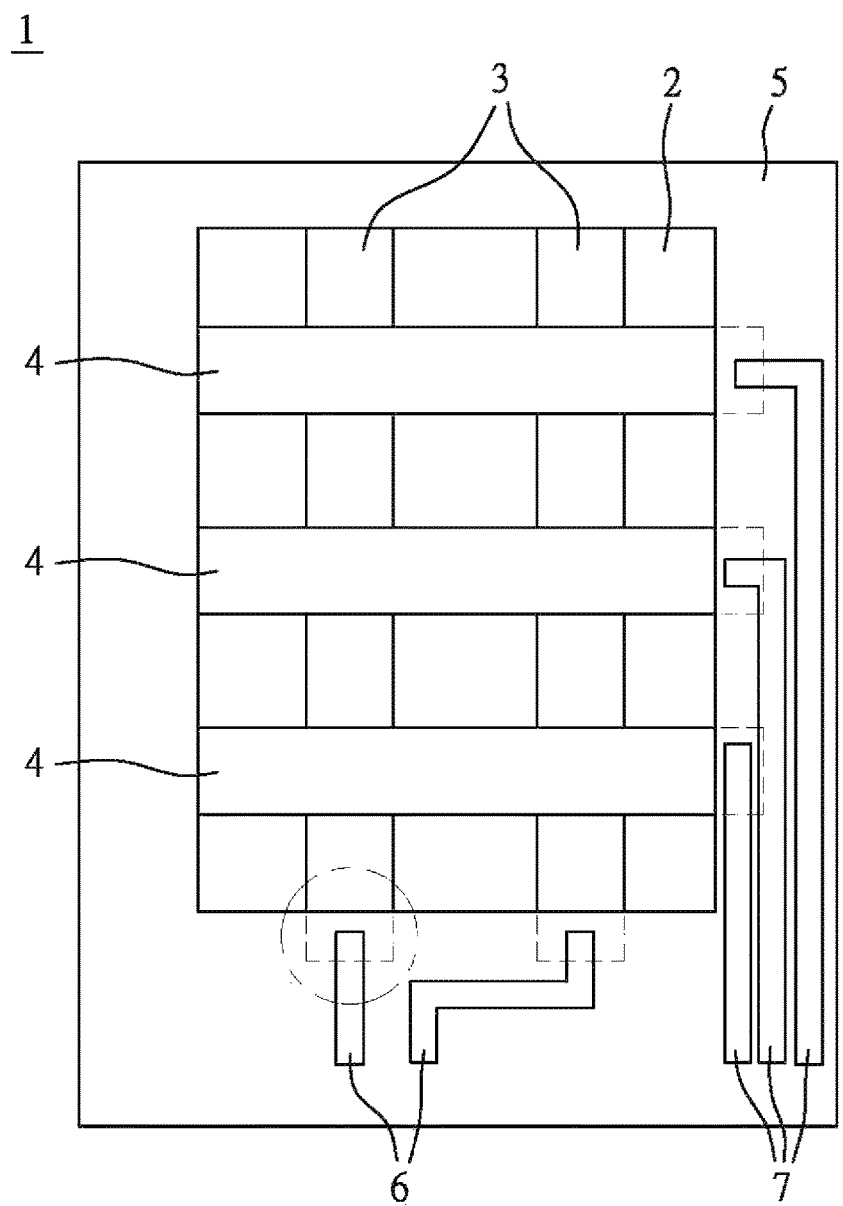
FIG. 1 is a top view of an exemplary embodiment of a touch-sensitive device according to the present disclosure.

Before the present disclosure is described in greater detail with reference to the accompanying exemplary embodiment with multiple variations, it should be noted herein that like elements are denoted by the same reference numerals throughout the disclosure.

Figure 2:
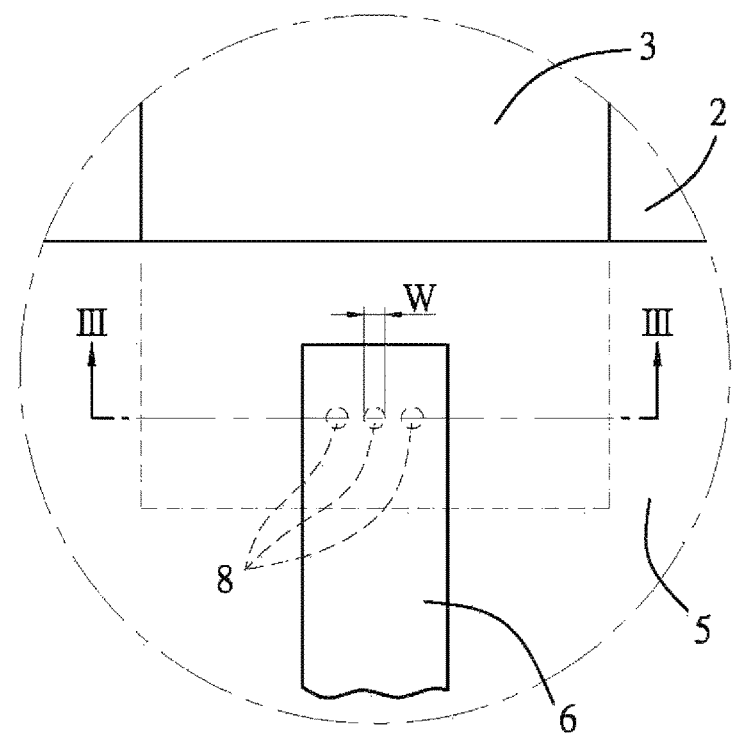
FIG. 2 is a partially enlarged view of FIG. 1.
Figure 3:
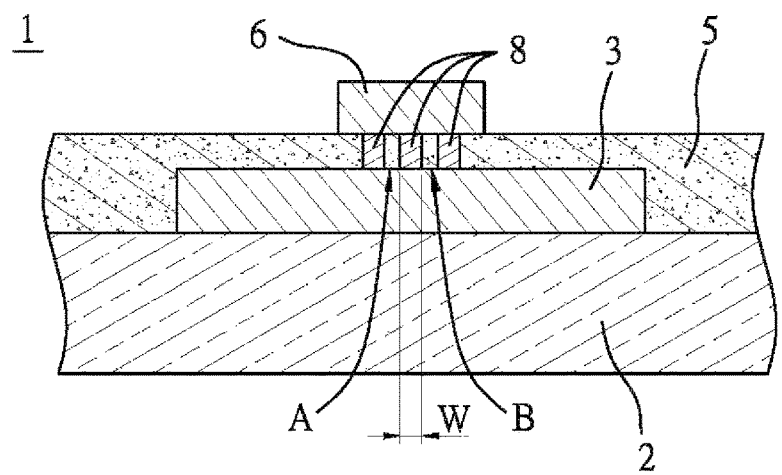
FIG. 3 is a cross-sectional view taken along line of III-III of FIG. 2.

Referring to FIGS. 1 to 3, some embodiments of a touch-sensitive device 1 according to the present disclosure may be used in smart phones, tablet computers, notebook computers and other electronic devices. The touch-sensitive device 1 includes a cover plate 2, a plurality of first touch-sensing electrodes 3, a plurality of second touch-sensing electrodes 4, a masking layer 5, a plurality of first traces 6, a plurality of second traces 7 and a plurality of electrically-conductive interconnects 8 (shown in FIG. 2).

The cover plate 2 is a surface structure for a user to touch and may be a rigid substrate (e.g., a glass substrate), a flexible substrate or other types of substrates.

The first and second touch-sensing electrodes 3, 4 are disposed on the cover plate 2 in a crisscross manner. The first touch-sensing electrodes 3 extend in a specific direction different from that of the second touch-sensing electrodes 4. In some embodiments, the first and second touch-sensing electrodes 3, 4 are made of a light-transmissible and conductive material selected from indium tin oxide (ITO), aluminum-doped zinc oxide (AZO), zinc oxide (ZnO), antimony tin oxide (ATO), tin oxide ($SnO_2$), indium oxide ($In_2O_3$) and the like. In some embodiments, the first and second touch-sensing electrodes 3, 4 are made of a conductive material selected from nano silver, nano copper, carbon nano tube, metal mesh and the like. When a user touches the cover plate 2, a capacitance change is induced and recorded as a touch signal. In some embodiments, each of the first and second touch-sensing electrodes 3, 4 is strip-shaped. In some embodiments, the shape, number, dimension and spacing of the first and second touch-sensing electrodes 3, 4 is varied according to practical requirements. Moreover, in some embodiments, the first and second touch-sensing electrodes 3, 4 are respectively configured as a single-layered light-transmissible and conductive film as shown in FIG. 1. In some embodiments, the touch-sensitive device 1 further includes an insulating layer (not shown) and a connecting wire (not shown) disposed at intersections of the first and second touch-sensing electrodes 3, 4. Besides the configuration disclosed in some embodiments, the first and second touch-sensing electrodes 3, 4 are respectively configured as a double-layered light-transmissible and conductive film. The configuration of the first and second touch-sensing electrodes 3, 4 may be varied for different requirements and should not be limited by the examples disclosed herein.

The masking layer 5 is disposed on a periphery of the cover plate 2 and covers part of the first and second touch-sensing electrodes 3, 4. In some embodiments, the masking layer 5 has a single-layered or multi-layered film structure made of color photoresist, color ink, etc. for ornamental purposes and covering the first and second touch-sensing electrodes 3, 4.

The first and second traces 6, 7 are disposed on the masking layer 5 opposite to the first and second touch-sensing electrodes 3, 4 and respectively partially overlap the first and second touch-sensing electrodes 3, 4. The first and second traces 6, 7 transfer touch signals generated by the first and second touch-sensing electrodes 3, 4 to external devices. In some embodiments, the first and second traces 6, 7 are made using conductive metal with film deposition or patterning techniques, or conductive silver paste with a screen printing technique. The materials and techniques used for forming the first and second traces 6, 7 should not be limited by the examples disclosed herein.

The electrically-conductive interconnects 8 are spaced apart from one another and penetrate the masking layer 5 for electrical interconnection of the first touch-sensing electrodes 3 to the first traces 6, and electrical interconnection of the second touch-sensing electrodes 4 to the second traces 7. FIGS. 2 and 3 show interconnection of one of the first touch-sensing electrodes 3 and a corresponding one of the first traces 6. In some embodiments, the electrically-conductive interconnects 8 are made of electrically-conductive carbon adhesive. In other embodiments, the electrically-conductive interconnects 8 and the first and second traces 6, 7 are all made of the same material selected from silver paste, metal and the like. When made of the same material, in some embodiments, the first traces 6, the second traces 7 and the electrically-conductive interconnects 8 are integrally formed in the same processing step.

In some embodiments, each of the electrically-conductive interconnects 8 is a cylinder and has a width (W) (i.e., diameter) ranging from about 0.005 mm to about 0.05 mm. In other examples, each of the electrically-conductive interconnects 8 may have a cross-section shaped as a rectangle, polygon, etc. The cross-section of each of the electrically-conductive interconnects 8 is not limited to that disclosed herein. At a distance of 30 cm between the naked eye of a user and a display screen, the naked eye perceives a resolution of about 0.05 mm for adjacent pixels of the display screen. That is to say, at the same observation distance of 30 cm, two adjacent pixels may be viewed as a continuous pixel if the adjacent pixels are spaced apart at a distance of less than about 0.05 mm. Therefore, in some embodiments, the width (W) of each of the electrically-conductive interconnects 8 is not greater than about 0.05 mm, such that the user may not perceive the electrically-conductive interconnects 8 and may see part of the masking layer 5 surrounding the electrically-conductive interconnects 8 (such as regions A, B shown in FIG. 3) as continuous. Accordingly, the appearance of the touch-sensitive device 1 could be improved by preventing the electrically-conductive interconnects 8 from being perceivable by the naked eye. In some embodiments, the masking layer 5 and the electrically-conductive interconnects 8 are made of materials having similar ingredients and colors, or materials having distinct colors without being easily discernible by the user. Moreover, a minimum spacing distance between an adjacent two of the electrically-conductive interconnects 8 is larger than the width of each of the electrically-conductive interconnects 8 and ranges from about 0.1 mm to about 1 mm. Such spacing distance is greater than the resolution perceived by the naked eye. Therefore, the user would not view the adjacent two of the electrically-conductive interconnects 8 as being connected together, thereby further preventing the user from discerning the electrically-conductive interconnects 8.

Figure 4:
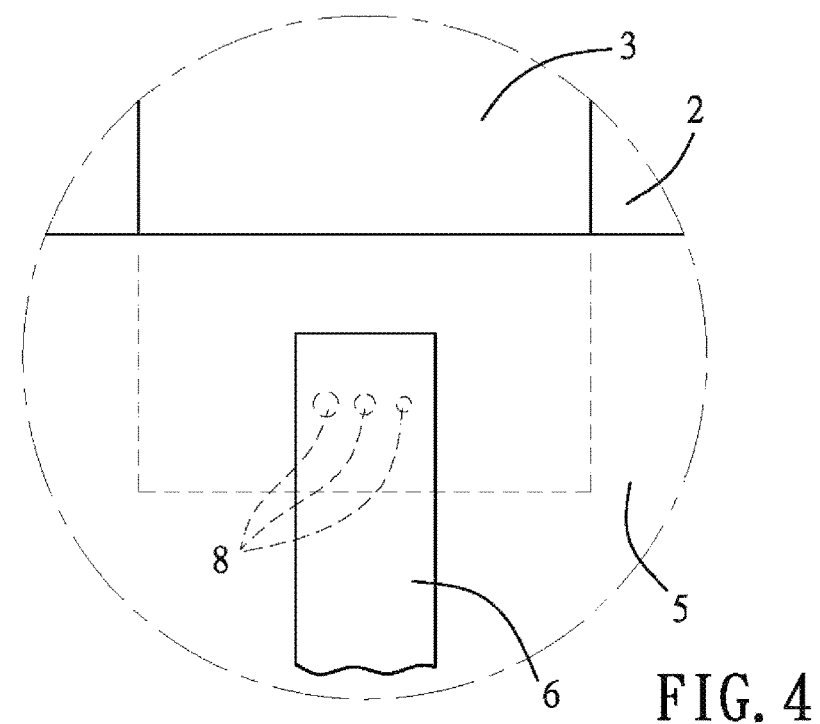
FIGS. 4-5 are multiple variations of the exemplary embodiment of the touch-sensitive device.
Figure 5:
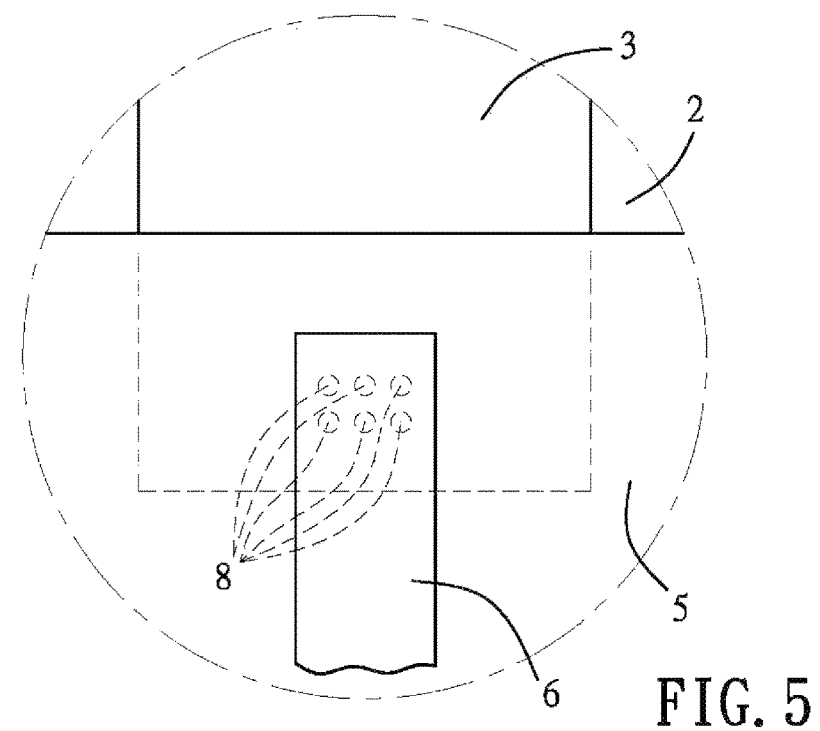

Referring to FIGS. 2, 4 and 5, an exemplary configuration of the electrically-conductive interconnects 8 (see FIG. 2) is to arrange the electrically-conductive interconnects 8 to have the same width and be in a line. A first variation of the configuration of the electrically-conductive interconnects 8 is shown in FIG. 4, where the electrically-conductive interconnects 8 are arranged to have increasing width. A second variation of the configuration of the electrically-conductive interconnects 8 is shown in FIG. 5, where the electrically-conductive interconnects 8 are arranged in an array. Accordingly, electrical interconnection of the first touch-sensing electrodes 3 and the first traces 6, and electrical interconnection of the second touch-sensing electrodes 4 and the second traces 7 could be maintained while at the same time improving the appearance of the touch-sensitive device 1.

The present disclosure also provides a production method for making a touch-sensitive device, such as the touch-sensitive device 1 shown in FIGS. 1 to 3. The first and second touch-sensing electrodes 3, 4 are first formed on the cover plate 2. By using screen printing or coating techniques, the masking layer 5 is then formed on the periphery of the cover plate 2 to cover part of the first and second touch-sensing electrodes 3, 4. By using laser etching or photolithography techniques, a plurality of spaced apart through holes (not shown) are formed in the masking layer 5 at regions covering the first and second touch-sensing electrodes 3, 4. A plurality of the electrically-conductive interconnects 8 are formed in the through holes. Finally, the first and second traces 6, 7 are formed on the masking layer 5 opposite to the first and second touch-sensing electrodes 3, 4 and connected to the electrically-conductive interconnects 8.

In the abovementioned method, in some embodiments, the electrically-conductive interconnects 8 and the first and second traces 6, 7 are made sequentially from different materials. For example, the electrically-conductive interconnects 8 are made from electrically-conductive carbon adhesive and the first and second traces 6, 7 are made from a material selected from silver paste, metal and the like by screen printing, film deposition or photolithography. In another example, the electrically-conductive interconnects 8 and the first and second traces 6, 7 are integrally formed with the same material.

To sum up, through the various dimensions and configurations of the electrically-conductive interconnects 8 of the touch-sensitive device 1 according to the present disclosure, the electrically-conductive interconnects 8 may be rendered imperceivable to the user, thereby improving the appearance of the touch-sensitive device 1.

While the present disclosure has been described in connection with what is considered the most practical embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A production method of making a touch-sensitive device, comprising the steps of:
    (A) forming at least one touch-sensing electrode on a cover plate and along a specific direction;
    (B) forming a masking layer that is disposed on a periphery of the cover plate, that covers part of the touch-sensing electrode and that is formed with a plurality of spaced apart through holes at regions covering the touch-sensing electrode; and (C) forming a plurality of electrically-conductive interconnects in the through holes, and forming at least one trace that is disposed on the masking layer opposite to the touch-sensing electrode and that is connected to the electrically-conductive interconnects, wherein the trace is made of a silver paste, the electrically-conductive interconnects are made of an electrically-conductive carbon adhesive, and a minimum spacing distance between an adjacent two of said electrically-conductive interconnects is 0.1 mm.

2. The production method of making a touch-sensitive device as claimed in claim 1, wherein, in step (B), the through holes are formed by laser etching or photolithography techniques.

3. The production method of making a touch-sensitive device as claimed in claim 2, wherein, in step (C), the electrically-conductive interconnects and the trace are made sequentially from different materials.

4. The production method of making a touch-sensitive device as claimed in claim 2, wherein, in step (C), the electrically-conductive interconnects and the trace are made integrally from the same material.

5. A production method of making a touch-sensitive device, comprising the steps of:

(A) forming at least one touch-sensing electrode on a cover plate and along a specific direction;

(B) forming a masking layer that is disposed on a periphery of said cover plate, that covers part of said touch-sensing electrode and that is formed with a plurality of spaced apart through holes penetrating said masking layer at regions covering said part of said touch-sensing electrode;

(C) forming a plurality of electrically-conductive interconnects in said through holes; and (D) forming a plurality of traces on said masking layer opposite to said touch-sensing electrode so said electrically-conductive interconnects extend through said masking layer between (i) said part of one of said touch-sensing electrodes covered by said masking layer and (ii) one of said traces, connecting said one of said traces to said electrically-conductive interconnects, wherein a minimum spacing distance between an adjacent two of said electrically-conductive interconnects is 0.1 mm.

6. The production method of making a touch-sensitive device as claimed in claim 5, wherein, in step (B), said through holes are formed by laser etching or photolithography techniques.

7. The production method of making a touch-sensitive device as claimed in claim 5, wherein the trace is made of a silver paste, and the electrically-conductive interconnects are made of an electrically-conductive carbon adhesive.

* * * * *